United States Patent
Klein

(10) Patent No.: US 10,325,096 B1
(45) Date of Patent: *Jun. 18, 2019

(54) MODIFYING A PORTION OF A READ-ONLY FILE SYSTEM

(71) Applicant: Twitter, Inc., San Francisco, CA (US)

(72) Inventor: Matthew D. Klein, Seattle, WA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,601

(22) Filed: Aug. 28, 2017

Related U.S. Application Data

(63) Continuation of application No. 14/253,178, filed on Apr. 15, 2014, now Pat. No. 9,747,451.

(60) Provisional application No. 61/812,205, filed on Apr. 15, 2013.

(51) Int. Cl.
G06F 21/57 (2013.01)

(52) U.S. Cl.
CPC .... *G06F 21/575* (2013.01); *G06F 2221/2105* (2013.01); *G06F 2221/2141* (2013.01)

(58) Field of Classification Search
None
See application file for complete search history.

(56) References Cited

U.S. PATENT DOCUMENTS

| | | |
|---|---|---|
| 6,308,265 B1 | 10/2001 | Miller |
| 2009/0121028 A1 | 5/2009 | Asnaashari |
| 2011/0093950 A1 | 4/2011 | Bhargava |
| 2012/0151021 A1 | 6/2012 | Bolay |
| 2014/0041053 A1 | 2/2014 | Edwards |

*Primary Examiner* — Kim Huynh
*Assistant Examiner* — Joshua Neveln
(74) *Attorney, Agent, or Firm* — Fish & Richardson P.C.

(57) ABSTRACT

A system and method for message analysis, including: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; provisioning, by the control service, the computing device to operate in a read/write state in response to determining that the permission criteria has been satisfied, wherein the first modification request is executed to modify the file system while the computing device is operating in the read/write state; and, upon a determination that the first modification request has successfully completed, provisioning, by the control service, the computing device to operate in the read-only state.

21 Claims, 7 Drawing Sheets

MODIFYING A PORTION OF A READ-ONLY FILE SYSTEM

CROSS-REFERENCE TO RELATED APPLICATIONS

This application is a continuation application of U.S. application Ser. No. 14/253,178, filed Apr. 15, 2014, which claims the benefit of U.S. Provisional Application No. 61/812,205, filed on Apr. 15, 2013, each of which is incorporated herein by reference in its entirety.

BACKGROUND

Computing devices are often configured for use by multiple users. For example, a computing device such as a file server can be used to maintain files that can be accessed by multiple users. With multiple users accessing a computing device, there is an increased probability that a file system of the computing device may be accidentally or maliciously modified by a user. Large datacenters can manage hundreds or thousands of such computing device and these modifications can result in divergence in the file systems across the computing devices, resulting in errors and overall entropy of the system.

SUMMARY

In general, in one aspect, the invention relates to a method for performing configuration changes. The method can include: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; provisioning, by the control service, the computing device to operate in a read/write state in response to determining that the permission criteria has been satisfied, wherein the first modification request is executed to modify the file system while the computing device is operating in the read/write state; and, upon a determination that the first modification request has successfully completed, provisioning, by the control service, the computing device to operate in the read-only state.

In general, in one aspect, the invention relates to a method for performing configuration changes. The method can include: receiving, by a computing device, a first modification request to modify a file system of the computing device, wherein the computing device is operating in a read-only state; identifying, by the computing device, a request parameter associated with the first modification request; determining, by the computing device, that the request parameter satisfies a permission criteria to perform the first modification request; provisioning, by the computing device, to operate in a read/write state in response to determining that the permission criteria has been satisfied; executing, by the computing device, the first modification request while the computing device is operating in the read/write state; and, upon a determination that the first modification request has been successfully completed, provisioning, by the computing device, to operate in the read-only state.

In general, in one aspect, the invention relates to a method for performing configuration changes. The method can include: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; and transmitting, by the control service and to the computing device, a provisioning command to operate in a read/write state, wherein the first modification request is executed to modify the file system while the computing device is operating in the read/write state.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
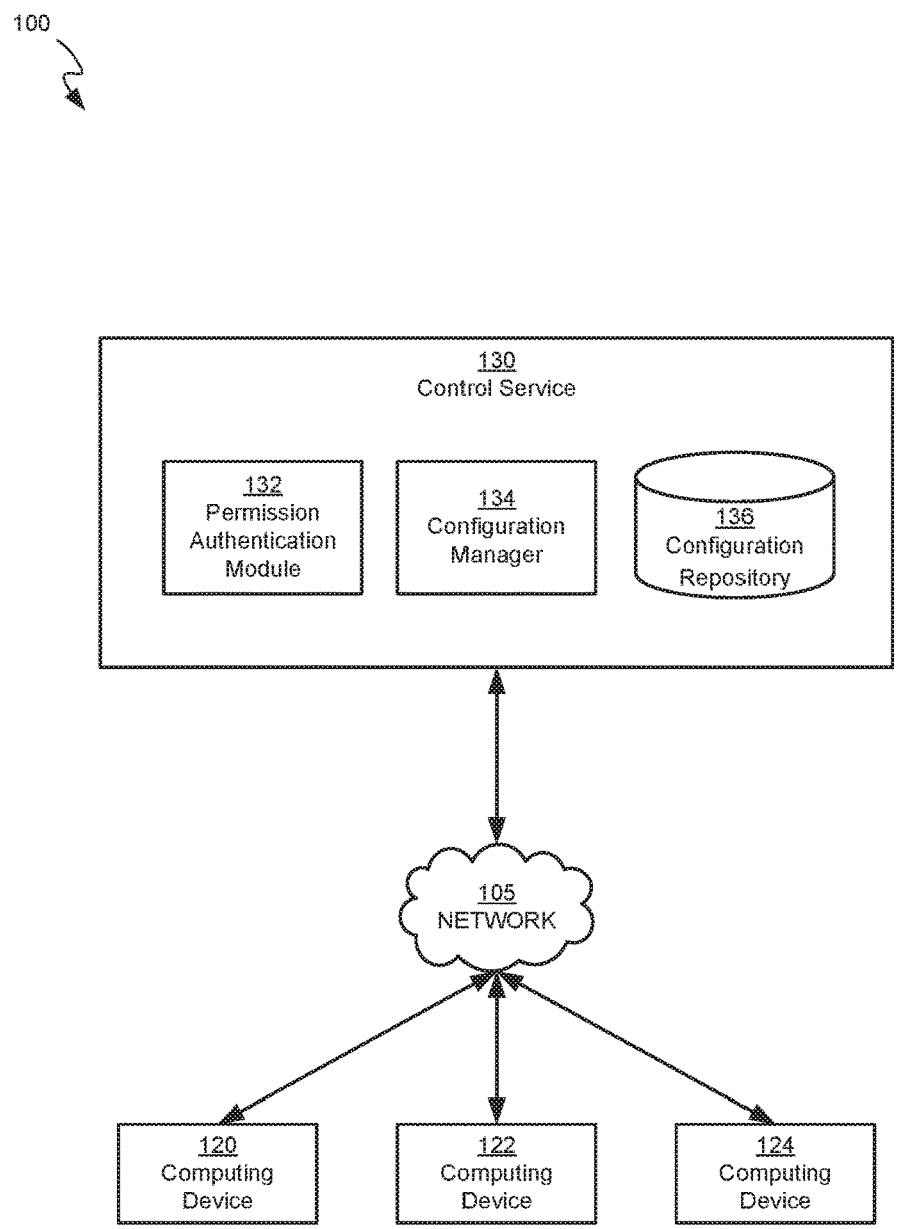
FIG. 1 shows a computing system in accordance with one or more embodiments of the invention.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

In general, embodiments of the invention provide a method and system for performing configuration changes on a computing device. To prevent unwanted changes to the file system of a computing device, a control service can be configured to manage modification requests to modify the computing device. For example, a computing device can operate in a read-only state that does not allow changes to the file system. The control service can receive modification requests requesting to modify the file system of the computing device and determine whether to grant the modification request based on whether request parameters associated with the modification request satisfy a permission threshold to perform the modification request. If the control service determines that the permission threshold is satisfied, the control service can provision the computing device to operate in a read/write state, allowing the modification request to execute and modify the file system. After the modification request has successfully completed, the control service can provision the computing device to operate in the read-only state, preventing further changes to the computing device.

FIG. 1 shows a computing system 100 in accordance with one or more embodiments. As shown, multiple computing devices 120, 122, and 124 and a control service 130 can be communicatively coupled with a communication network 105 and configured to communicate with each other to send and receive data. In one or more embodiments, the computing devices 120, 122, and 124 are a network switch, a server, or any other type of computing device known in the art.

In one or more embodiments, the control service 130 includes functionality to manage configuration changes for a computing device 120. For example, in one or more embodiments, the control service 130 includes functionality to receive a modification request to modify a file system of a computing device 120. The computing device 120 can be operating in a read-only state to, for example, prevent unwanted changes to the file system of the computing device 120. In one or more embodiments, the control service 130 can receive the modification request from a computing device 120. Alternatively, in one or more embodiments, the control service 130 can receive the modification request locally, for example, from a user logged into the control service 130 either directly or remotely.

In one or more embodiments, the control service 130 includes functionality to identify a request parameter associated with the modification request. A request parameter can be any type of parameter, condition, etc., that describes the modification request.

In one or more embodiments, the request parameter is a directory of the file system to be modified, a file of the file system to be modified, an account identifier of an account that made the modification request, authentication data for an account that made the modification request, and a type of modification requested by the modification request, or any type of parameter, condition, etc., that describes or is associated with a modification request.

In one or more embodiments, the control service 130 can include a permission authentication module 132 that includes functionality to identify one or more request parameters from the modification request. For example, the computing device 120 can include functionality to include metadata describing the requested modification in the modification request. The permission authentication module 130 can gather the metadata included in the modification request to identify the request parameters associated with the modification request.

In one or more embodiments, the control service 130 can include functionality to determine that the request parameter satisfies a permission criteria to perform the modification request on the computing device 120. For example, the permission authentication module 132 can include functionality to identify appropriate permission criteria based on the modification request and the gathered request parameter(s). Permission criteria can define one or more conditions that must be met for a specified modification request to be approved, resulting in execution of the requested modification. For example, a permission criteria associated with modifying a specified file can be that the modification request be made by one of a specified group of requesting user accounts, thus limiting the ability to modify the specified file to the specified group of requesting user account. Requests to modify the specified file system that are made by user accounts not included in the specified group can be denied.

The control service 130 can include a configuration repository 136 including functionality to maintain a permission criteria index listing permission criteria for performing specified modifications. The permission authentication module 132 can include functionality to communicate with the configuration repository 136 to search the permission criteria index to identify the permission criteria associated with a received modification request. The permission criteria index can list permission criteria based on various type of request parameters. For example, permission criteria can be listed according to the computing device that will be modified, the directory to be modified, the file or file system to be modified, the type of modification requested, etc. The permission authentication module 132 can include functionality to search the permission criteria index based on the gathered request parameters to identify the permission criteria associated with a received modification request.

The permission authentication module 132 can determine whether the request parameter(s) satisfy the identified permission criteria to perform the modification request on the computing device 120. If the permission authentication module 132 determines that the request parameter(s) do satisfy the permission criteria, the permission authentication module 132 can grant the modification request. Conversely, if the permission authentication module 132 determines that the request parameter(s) do not satisfy the permission criteria, the permission authentication module 132 can deny the modification request.

In one or more embodiments, to determine that the request parameter satisfies the permission criteria to perform the modification request, the control service 130 includes functionality to determine that an account identified by an account identifier in the request parameter has authorization to perform a type of modification requested by the modification request. The permission criteria can be based on an account requesting to perform the modification request and/or the type of modification requested. For example, the permission authentication module 132 can include functionality to identify an account identifier identifying the user or user account that requested the modification. If the permission authentication module 132 determines that an account identified by an account identifier has authorization to perform the type of modification requested by the modification request, the permission authentication module 132 can grant the modification request.

In one or more embodiments, to determine that the request condition satisfies the permission criteria to perform the first modification request, the control service 130 includes functionality to determine that a type of modification requested by the modification request is permitted on a directory of the file system to be modified. The permission criteria can be based on the type of modification requested and/or the file system to be modified. For example, if the permission authentication module 132 determines that the type of modification requested by the modification request is permitted on a directory of the file system to be modified, the permission authentication module 132 can grant the modification request.

In one or more embodiments, to determine that the request condition satisfies the permission criteria to perform the first modification request, the control service 130 includes functionality to determine that an account identified by the modification request is authorized to modify a file. For example, the permission criteria can be based on the account requesting to perform the modification request and/or the file to be modified. If the permission authentication module 132 determines that an account identified by the modification request is authorized to modify a file, the permission authentication module 132 can grant the modification request.

In one or more embodiments, the control system 120 includes functionality to provision the computing device 120 to operate in a read/write state in response to determining that the permission criteria has been satisfied. For example, the control system 132 can include a configuration manager 134 that includes functionality to provision a computing device 120 to operate in a read/write state. Operating in the read/write state can allow the file system of the computing device 120 to be read and modified.

In one or more embodiments, the control service 130 includes functionality to transmit, to the computing device 120, a modification command to provision the computing device 120 to operate in the read/write state. The modification command can be a command instructing the computing device 120 to provision to operate in the read/write state. For example, in response to the permission authentication module 132 determining that a permission criteria to perform a modification request has been satisfied, the permission authentication module 132 can notify the configuration manager 134 to provision the computing device 120 to operate in a read/write state.

The computing device 120 can provision to operate in the read/write state upon receiving the modification command. Provisioning can include any type of function or process to initiate or alter the state of the computing device 120. In one or more embodiments, provisioning can include receiving, installing, and/or altering an operating system. In one or more embodiments, provisioning can include allocating resources. For example, provisioning can allocate physical resources such as networking, memory, processing and power resources. In one or more embodiments, provisioning can include allocating an IP address or bandwidth. In one or more embodiments, provisioning can include provisioning software or installing software.

In one or more embodiments, provisioning can include reconfiguring the computing device 120. For example, provisioning can include reconfiguring the computing device 120 by modifying configurations of the computing device 120, such as configuration files of the computing device 120. Alternatively, provisioning can include reconfiguring the computing device 120 to modify the IP address, bandwidth, permissions, etc. of the computing device 120.

In one or more embodiments, the control service 120 can include functionality to transmit, to the computing device 120, a cold-boot provisioning command, where the cold-boot provisioning command causes the computing device 120 to reboot. In response to the cold-boot provisioning command, the computing device 120 can boot into a read/write provisioning state.

Alternatively, in one or more embodiments, the control service 120 can include functionality to transmit, to the computing device 120, a live provisioning command. A live provisioning command can provision the computing device 120 to operate in the read/write state without rebooting. In response to the live provisioning command, the computing device 120 may continue to service requests while provisioning to operate in the read/write state, and/or may continue to service requests while the modification request is executed.

In one or more embodiments, the computing device 120 continues to service requests while in the read/write state. For example, the computing device 120 can continue to receive service requests from one or more remote computing devices 122, 124, and/or locally from a user logged into computing device 120. As a result, the computing device 120 may continue to service modification requests while operating in the read/write state.

In one or more embodiments, provisioning the computing device 120 to operate in the read/write state can include provisioning a portion of the file system that will be modified by the modification request to operate in the read/write state. For example, a portion of the computing device 120 can be operating in the read-only state, while a portion of the computing device 120 can be operating in the read/write state. As a result, a higher protection of portions of the file system of the computing device can be achieved, while allowing other portions to be modified. Each portion of the computing device 120 can refer to a portion of the file system on a disk, a logical segmentation based on a grouping of applications, or any other allocation of permissions. For example, the permissions for a file used to store network settings may be changed to a read/write state in order to execute a modification request involving the file. Meanwhile, other operating system files that are unrelated to the modification request may be left in a read-only state Rather than provision the entire file system of the computing device 120 to operate in the read/write state, the portion of the file system that will be modified by the modification request can be provisioned, while other portions that will not be modified by the modification request can remain operating in the read-only state. As a result, further protection can be provided to the file system of the computing device 120.

In one or more embodiments, the modification request is executed to modify the file system while the computing device 120 is operating in the read/write state. The modification command can further instruct the computing device 120 to execute the modification request and modify the file system of the computing device 120. For example, the modification command can instruct the computing device 120 to cold-boot provision and execute the modification request upon booting in the read/write provisioning state. Alternatively, the modification command can instruct the computing device 120 to live provision to operate in the read/write state without rebooting the system, upon which the computing device 120 can execute the modification request.

In one or more embodiments of the invention, the control service 130 includes functionality to, upon a determination that the modification request has successfully completed, provision the computing device 120 to operate in the read-only state. For example, the computing device 120 can notify the control service 130 that the modification request has been executed. The control service 130 can then provision, send a command to provision, the computing device 120 to operate in the read-only state in response to receiving the notification indicating that the modification request has successfully completed.

In one or more embodiments, the control service 130 includes functionality to cold-boot provision the computing device 120 to operate in the read-only state by transmitting, to the computing device 120, a modification command to reboot the computing device 120. By rebooting, the computing device 120 can cause itself to boot into a read/write provisioning state, during which the computing device 120 can execute the modification request. For example, the modification command transmitted by the configuration manager 134 to the computing device 120 can be a reboot command instructing the computing device to reboot. Upon receiving the reboot command, the computing device 120 can reboot.

In one or more embodiments, the control service 130 includes functionality to log an execution of a modification request to modify the file system of the computing device 120. For example, the configuration repository 136 can maintain a configuration log and the configuration manager 134 can include functionality to communicate with the configuration repository 136 to edit the configuration log to log an execution of a modification request to modify the file system of a computing device 120.

In one or more embodiments, the control service 130 includes functionality to receive one or more other modification requests to modify the file system of the computing device 120, where the computing device 120 is operating in the read-only state. The control service 130 can receive the one or more other modification requests from a computing device 120. Alternatively, in one or more embodiments, the control service 130 can receive the one or more other modification requests locally, for example, from a user logged into the control service 130 either directly or remotely.

In one or more embodiments, the control service 130 includes functionality to identify a request parameter associated with the one or more other modification requests. For example, the control service 130 can gather the request parameter from metadata included in the one or more other modification requests.

In one or more embodiments, the control service 130 includes functionality to determine that the request parameter does not satisfy the permission criteria to perform the one or more other modification requests. For example, the permission authentication module 132 can gather the appropriate permission criteria from the configuration repository to determine that the permission criteria is not satisfied.

In one or more embodiments, the control service 130 includes functionality to deny the one or more other modification requests. For example, if the control service 130 received a modification request from the computing device 120, the control service 130 can transmit a command to the computing device 120 that the requested modification has been denied. Accordingly, the computing device 120 can remain operating in the read-only state and the requested modification will not be executed.

In one or more embodiments, the functionality to manage configuration changes as described with respect to the control service 130 can be implemented locally in a computing device 120 rather than in a network-based configuration as shown in FIG. 1. For example, the computing device can include functionality to receive a modification request to modify a file system of the computing device 120, for example, from a user accessing the computing device 120 directly or remotely using a remote computing device 122. The computing device 120 can be operating in a read-only state to prevent unwanted changes to the file system.

The computing device 120 can identify a request parameter associated with a modification request. For example, the request parameter can identify the type of modification requested, a directory to be modified, a file or file system to be modified, an account identifier identifying the requesting user or user account, the time the modification request was received, the computing device to be modified, a remote computing device requesting to perform the modification, authentication data for the requesting user or user account, and/or any other type of parameter.

The computing device 120 can also include functionality to determine whether the the request parameter satisfies a permission criteria to perform the modification request. For example, the computing device 120 can include a local database including functionality to maintain a permission criteria index listing permission criteria for performing specified modifications. The computing device 120 can identify the appropriate permission criteria from the permission criteria index.

The computing device can further determine whether the request parameter(s) satisfy the identified permission criteria to perform the modification request on the computing device 120. If the computing device 120 determines that the request parameter(s) do satisfy the permission criteria, the permission authentication module 132 can grant the modification request. Conversely, if the permission authentication module 132 determines that the request parameter(s) do not satisfy the permission criteria, the permission authentication module 132 can deny the modification request.

In response to determining that the permission criteria has been satisfied, the computing device 120 can provision to operate in a read/write state, thus enabling the modification request to be executed. In one or more embodiments, the computing device 120 can provision itself to operate in the read/write state by rebooting, resulting the computing device booting up in a read/write provisioning state, during which the computing device 120 can execute the modification request.

Alternatively, the computing device 120 can provision to operate in the read/write state without rebooting. The computing device can then execute the modification request while the computing device 120 is operating in the read/write state.

Upon a determination that the modification request has been successfully completed, the computing device 120 can again provision to operate in the read-only state. In one or more embodiments, the computing device 120 can provision to operate in the read-only state by rebooting the computing device 120. Alternatively, in one or more embodiments, the computing device 120 can provision to operate in the read-only state without rebooting.

A modification request can be any type of request to modify the computing device 120. For example, in one or more embodiments, the modification request can be a request to install software on the computing device 120 received from a remote computing device 122. To execute the modification request, the computing device can download the software from the remote computing device 122 and install the software on the computing device. Alternatively, the computing device 120 can receive the modification request locally as a result of a user interacting directly with the computing device 120. The computing device 120 can either download the software from a remote computing device 120 or, alternatively, install it from a local drive of the computing device 120.

Although the components of system 100 are depicted as being directly communicatively coupled to one another, this is not necessarily the case. For example, one or more of the components of system 100 may be communicatively coupled via a distributed computing system, a cloud computing system, or a networked computer system communicating via the Internet.

Although only one control service 130 is illustrated, it should be appreciated that this one service may represent many computer systems, arranged in a central or distributed fashion, for example, such computer systems may be organized as a central cloud and/or may be distributed geographically or logically to edges of a system such as a content delivery network or other arrangement.

Figure 2A:
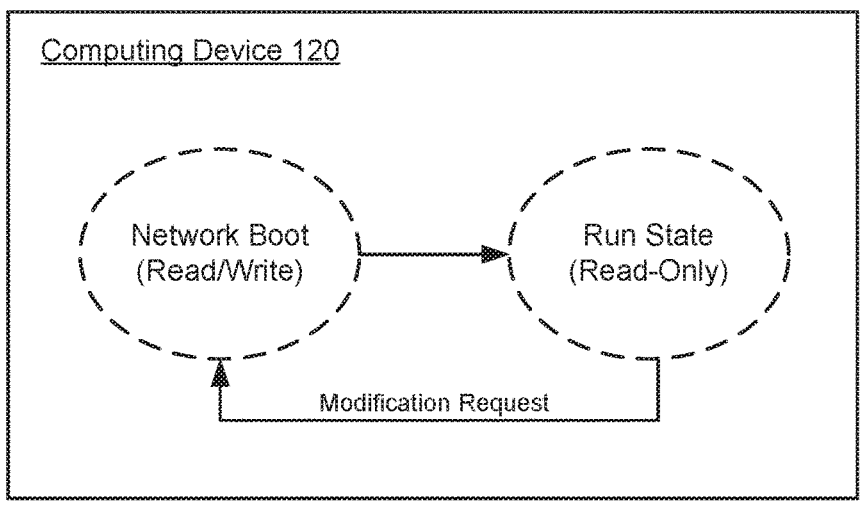
FIG. 2A shows an example of various states and components of a computing device in accordance with one or more embodiments of the invention.

FIG. 2A shows an example of various operating states of a computing device 120. In the example of FIG. 2A, the computing device 120 includes functionality to receive a modification request (e.g., from an administrator, software component, or other entity) while operating in a read-only state. In response to the modification request, the computing device 120 can perform a reboot operation (e.g., a network boot). The reboot operation can cause the computing device 120 to provision to operate in a read/write state, during which the computing device 120 can implement one or more requested modification(s) (e.g., configuration modification, operating system modification, file system modification, and/or etc.). By performing the reboot operation, the computing device 120 can become temporarily disabled, which can lead to an interruption of execution of services by the computing device 120.

Figure 2B:
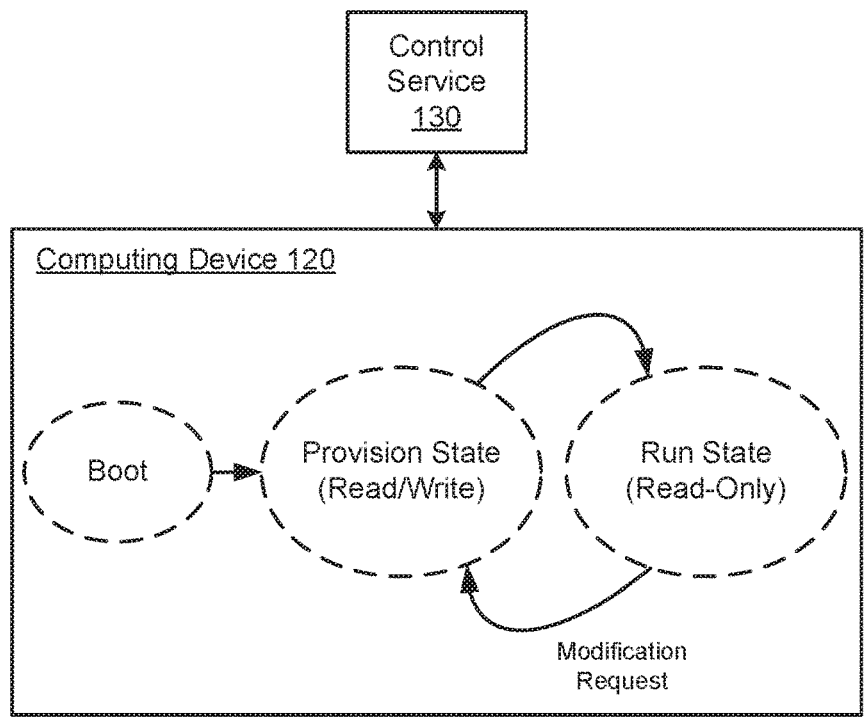
FIG. 2B shows an example of a computing device 120 and a remote control service in accordance with one or more embodiments of the invention.

FIG. 2B shows an example of a computing device 120 and a remote control service 130. The control service 130 can include functionality to receive a modification request (e.g., from an administrator, software component, or other entity) while the computing device 120 is operating in a read-only state. The control service 130 can serve as a remote intermediary service including functionality to manage modification requests by controlling access and permissions, and by logging changes across any number of connected computing devices (e.g., computing devices 122 and 124).

In response to the authorization of a modification request by the control service 130, the control service 130 can cause the computing device 120 to operate in a read/write state to execute the requested modification and concurrently continue to execute relevant services. After the computing device 120 performs the requested modification, the modifications can be logged by the control service 130 and the computing device 120 can be provisioned to operate in the read-only state. In this example, the process of performing the aforementioned modification does not necessarily require a reboot or interruption of executing services.

Figure 3:
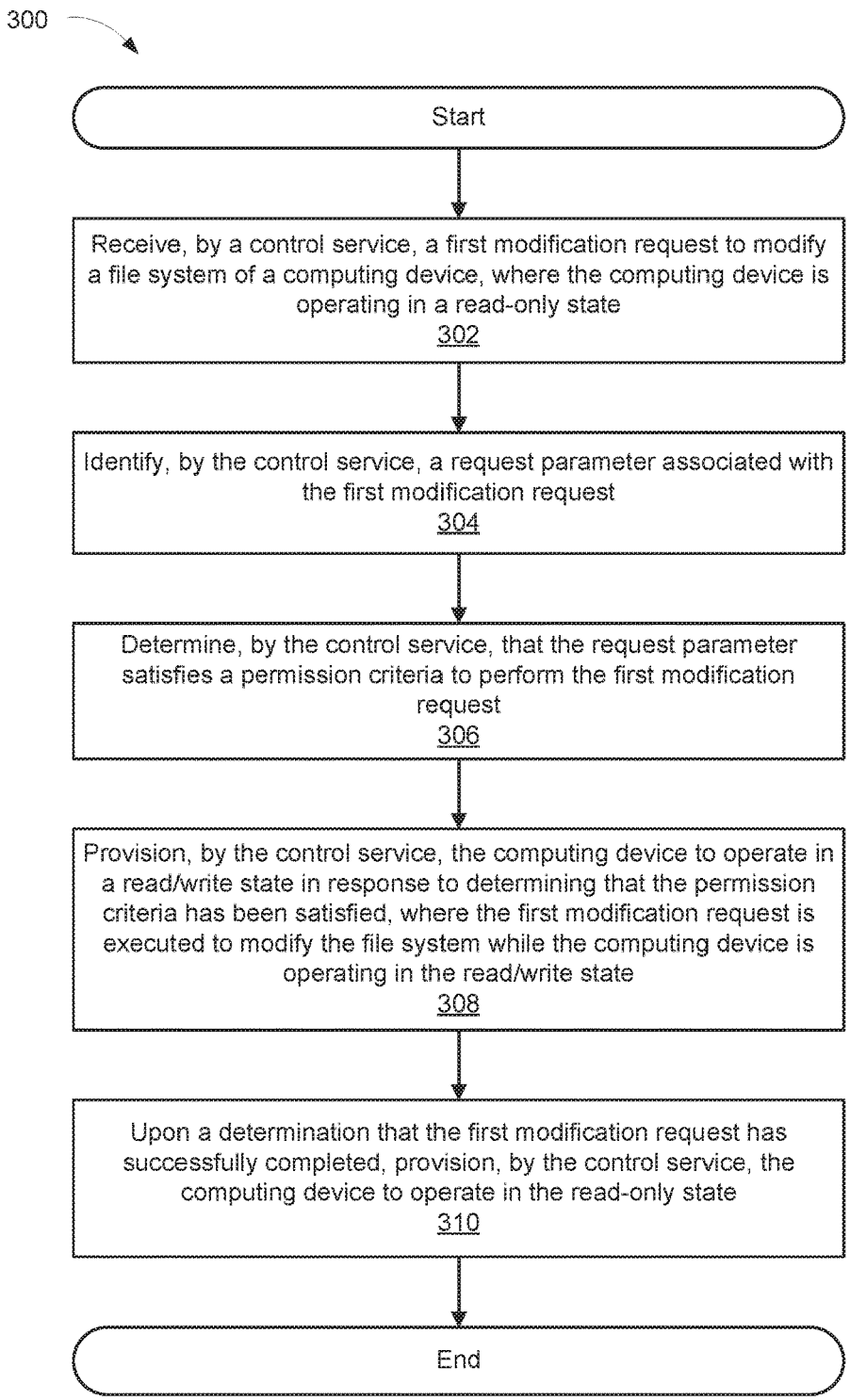
FIG. 3 shows a flowchart in accordance with one or more embodiments of the invention.

FIG. 3 shows a flowchart of a method 300 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 302, a first modification request to modify a file system of a computing device is received, where the computing device is operating in a read-only state. For example, the modification request can be a request to install software on the computing device, modify a file of the computing device, modify a directory of the computing device, etc. To avoid unwanted modifications to the computing device, the computing can be operating in a read only state that enables file on the computing device to be read, but not modified.

In STEP 304, a request parameter associated with the first modification request is identified. A request parameter can be any type of parameter, condition, etc., that describes the modification request. For example, a request parameter can identify the type of modification requested, a directory to be modified, a file or file system to be modified, an account identifier identifying the requesting user or user account, the time the modification request was received, the computing device to be modified, a remote computing device requesting to perform the modification, authentication data for the requesting user or user account, and/or any other type of parameter.

In one or more embodiments, the request parameter can be identified from the modification request. For example, the computing device can include metadata describing the requested modification in the modification request. The metadata included in the modification request can then be gathered to identify the request parameters associated with the modification request.

In STEP 306, it is determined that the request parameter satisfies a permission criteria to perform the first modification request. Permission criteria can define one or more conditions that must be met for a specified modification request to be approved, resulting in execution of the requested modification. For example, a permission criteria associated with modifying a specified file can be that the modification request be made by one of a specified group of requesting user accounts, thus limiting the ability to modify the specified file to the specified group of requesting user accounts. Requests to modify the specified file system that are made by user accounts not included in the specified group can be denied.

In one or more embodiments, the permission criteria for the modification request can be gathered from a permission criteria index that lists the permission criteria for various modification requests. The permission criteria index can list permission criteria based on various types of request parameters. For example, permission criteria can be listed according to the computing device that will be modified, the directory to be modified, the file or file system to be modified, the type of modification requested, etc.

The request parameters can be used to determine whether the identified permission criteria is satisfied. In one or more embodiments, the permission criteria can be based on an account requesting to perform the modification request and/or the type of modification requested. For example, the permission criteria can include a list of the account identifiers that are authorized to perform the modification request. A request parameter, such as an account identifier, that identifies the user or user account that requested to make the modification can be compared to the permission criteria listing the authorized account identifier to determine whether the permission criteria is satisfied.

In one or more embodiments, the permission criteria can be based on the type of modification requested and/or the file system to be modified. For example, the permission criteria can identify the types of modifications authorized on a file system. Request parameters identifying the file system to be modified can be used to determine whether the permission criteria is satisfied (e.g., the requested modification is authorized on the specified file system).

In one or more embodiments, the permission criteria can be based on the account requesting to perform the modification request and/or the file to be modified. For example, if it is determined that an account identified by the modification request is authorized to modify a file, the modification request can be granted.

In STEP 308, the computing device is provisioned to operate in a read/write state in response to determining that the permission criteria has been satisfied, where the first modification request is executed to modify the file system while the computing device is operating in the read/write state. Provisioning the computing device to operate in the read/write state allows the file system of the computing device to be read as well as modified, thus enabling execution of a modification request.

In one or more embodiments, a modification command can be transmitted to the computing device, which causes the computing device to provision to operate in the read/write state. The modification command can further instruct the computing device to execute the modification request and modify the file system of the computing device. Upon receiving a modification command, the computing device can provision itself to operate in the read/write state, and while in the read/write state, execute the modification request.

In one or more embodiments, the computing device can provision itself to operate in the read/write state by rebooting, causing the computing device to boot up in a read/write provisioning state, during which the modification request can be executed. For example, the modification command transmitted to the computing device can be a reboot command instructing the computing device to reboot.

Alternatively, in one or more embodiments, the computing device can provision itself to operate in the read/write states without rebooting the system. This can allow the computing device to continue to service modification requests while operating in the read/write state.

In STEP 310, upon a determination that the first modification request has successfully completed, the computing device is provisioned to operate in the read-only state. In one or more embodiments, the computing device can be provisioned to operate in the read-only state by rebooting. Alternatively, in one or more embodiments, the computing device can be provisioned to operate in the read-only state without rebooting.

Figure 4:
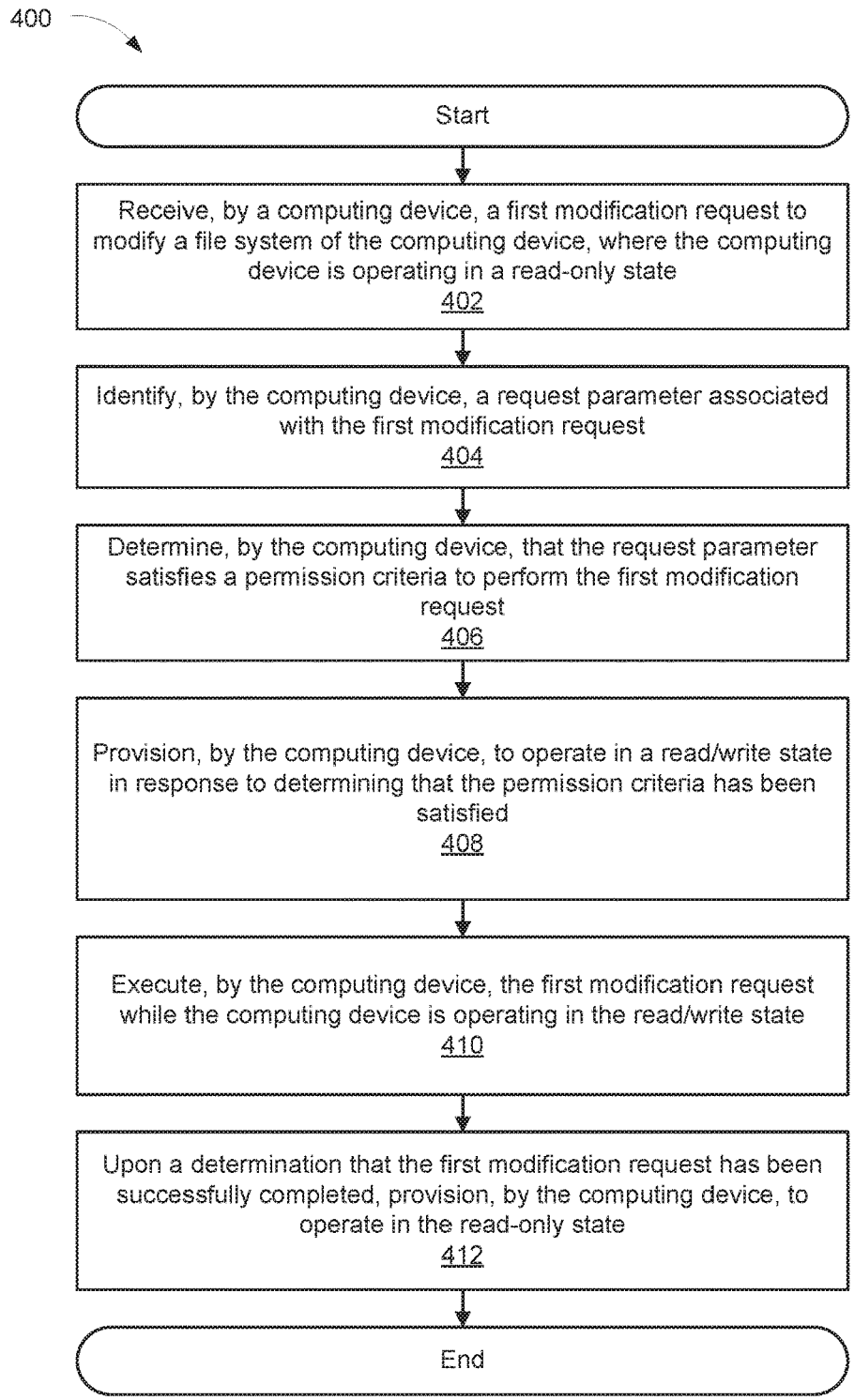
FIG. 4 shows a flowchart in accordance with one or more embodiments of the invention.

FIG. 4 shows a flowchart of a method 400 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 402, a first modification request to modify a file system of the computing device is received, where the computing device is operating in a read-only state. The modification request can be a request to make any type of modification to the file system of the computing device. For example, the modification request can be a request to change a directory or file on the computing device. Alternatively, the modification request can be a request to install software on the computing device.

In STEP 404, a request parameter associated with the first modification request is identified. A request parameter can by any type of parameter or condition describing the recommended request. For example, the request parameter can identify the requesting user or user account, a file of directory to be modified, software to be installed, etc. In one or more embodiments, the request parameter can be identified from metadata included in the modification request.

In STEP 406, it is determined that the request parameter satisfies a permission criteria to perform the first modification request. A permission criteria can define one or more conditions that must be met to perform a requested modification. The identified request parameter can be used to determine whether the permission criteria is satisfied. For example, a permission criteria can define a set of users authorized to perform a specified modification. A request parameter identifying the requesting user can be compared to the permission criteria defining the authorized users to determine whether the permission criteria is satisfied. If the requesting user is included in the set of users authorized to perform the specified modification, it can be determined that the request parameter satisfies the permission criteria to perform the requested modification.

In STEP 408, the computing device is provisioned to operate in a read/write state in response to determining that the permission criteria has been satisfied. Provisioning to operate in the read/write state can allow the requested modification to be executed. In one or more embodiments, the computing device can be provisioned to operate in the read/write state by rebooting the computing device, causing the computing device to boot up in a read/write provisioning state. Alternatively, the computing device can provision to operate in the read/write state without rebooting, which can allow the computing device to continue to service requests.

In STEP 410, the first modification request is executed while the computing device is operating in the read/write state. For example, the requested modification to the file system can be executed while the computing device operates in the read/write state. This can include modifying a file or directory, installing software, etc.

In STEP 412, upon a determination that the first modification request has been successfully completed, the computing device is provisioned, to operate in the read-only state. Provisioning of the computing device to operate in the read only state can provide protection against unwanted modifications to the file system of the computing device.

Figure 5:
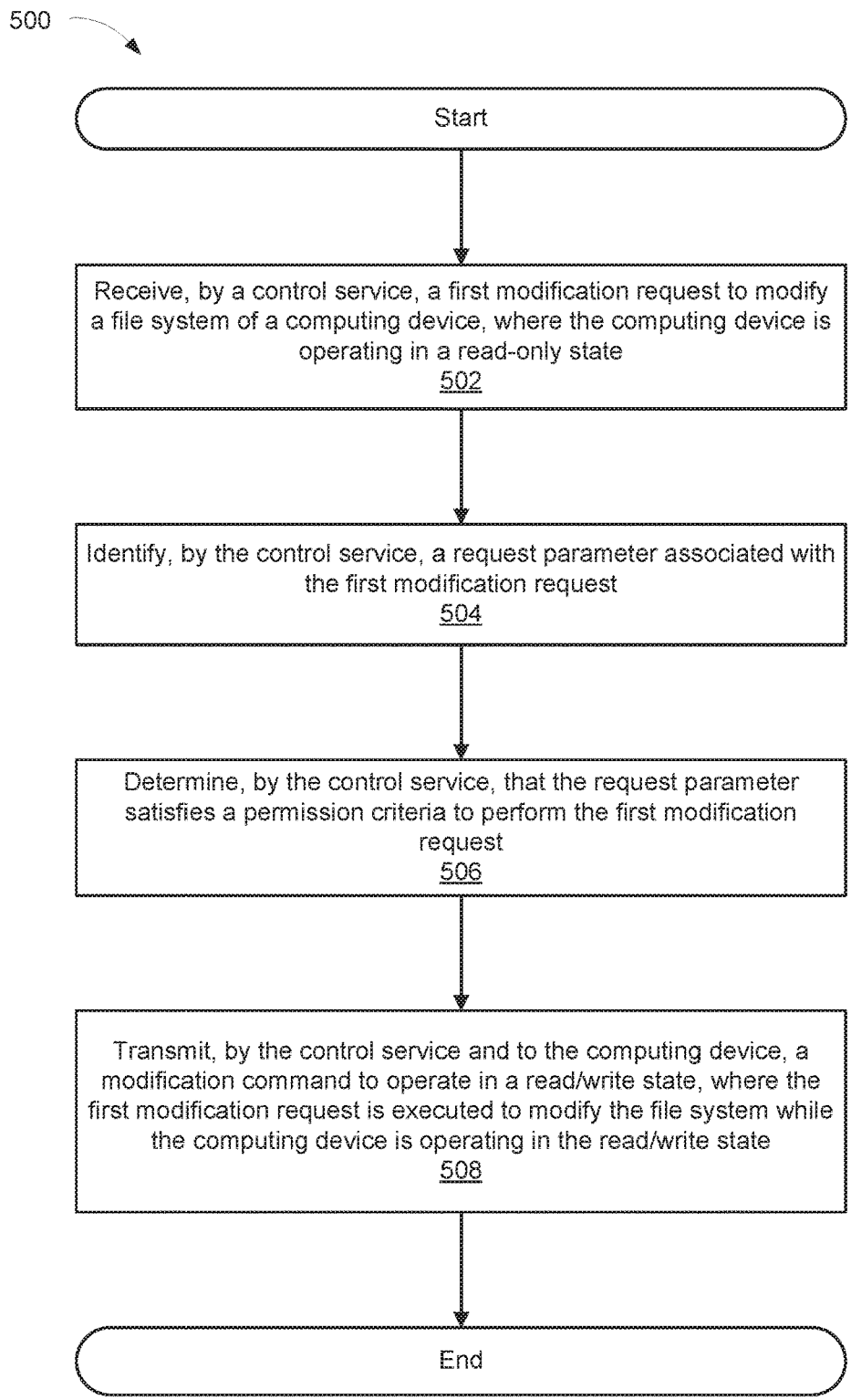
FIG. 5 shows a flowchart in accordance with one or more embodiments of the invention.

FIG. 5 shows a flowchart of a method 500 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In STEP 502, a first modification request to modify a file system of a computing device is received, where the computing device is operating in a read-only state. The modification request can be a request to perform any type of modification to the file system of the computing device, such as modifying a file or directory, installing software, etc. To prevent unwanted modifications, the computing device can be operating in a read-only state, which allows the file system of the computing device to be read, but not modified.

In STEP 504, a request parameter associated with the first modification request is identified. A request parameter can by any type of parameter or condition describing the recommended request. For example, the request parameter can identify the requesting user or user account, a file of directory to be modified, software to be installed, etc. In one or more embodiments, the request parameter can be identified from metadata included in the modification request.

In STEP 506, it is determined that the request parameter satisfies a permission criteria to perform the first modification request. A permission criteria can define one or more conditions that must be met to perform a requested modification. The identified request parameter can be used to determine whether the permission criteria is satisfied. For example, a permission criteria can define a set of users authorized to perform a specified modification. A request parameter identifying the requesting user can be compared to the permission criteria defining the authorized users to determine whether the permission criteria is satisfied. If the requesting user is included in the set of users authorized to perform the specified modification, it can be determined that the request parameter satisfies the permission criteria to perform the requested modification.

In STEP 508, a modification command to operate in a read/write state, is transmitted to the computing device, wherein the first modification request is executed to modify the file system while the computing device is operating in the read/write state. The modification command can be a command instructing a computing device to provision to operate in a specified state identified by the modification command. For example, a modification command can instruct a computing device to operate in a read/write or read only state. The modification command can cause a receiving computing device to provision to operate in the specified state upon receiving the modification command. In one or more embodiments, a modification command can cause a computing device to reboot to provision to operate in a specified state. For example, a modification command instructing a computing device running in a read-only state to provision to operate in a read/write state can cause the computing device to reboot. Rebooting the computing device can cause the computing device to boot in a read/write provisioning state, during which, modifications to the file system of the computing device can be executed.

Figure 6:
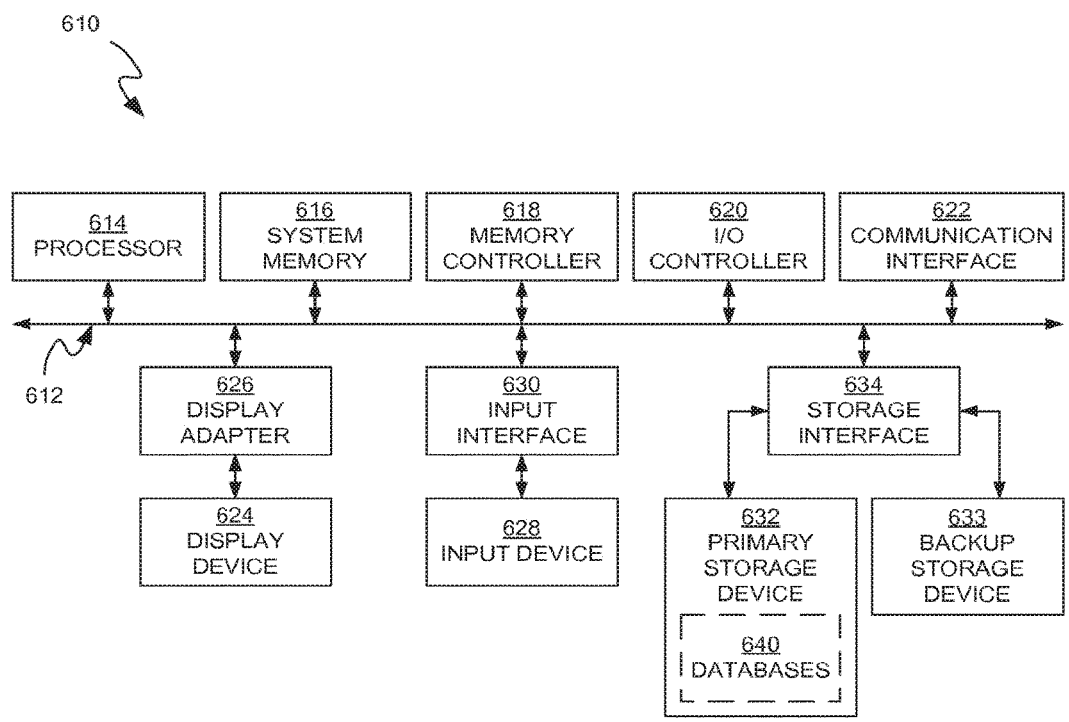
FIG. 6 is a block diagram of a computing system, in accordance with embodiments of the invention.

FIG. 6 is a block diagram of an example of a computing system 610 capable of implementing embodiments of the present disclosure. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, RAM, ROM, flash memory, or any other suitable memory device. Although not required, in certain embodiments computing system 610 may include both a volatile memory unit (such as, for example, system memory 616) and a non-volatile storage device (such as, for example, primary storage device 632).

Computing system 610 may also include one or more components or elements in addition to processor 614 and system memory 616. For example, in the embodiment of FIG. 6, computing system 610 includes a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between example computing system 610 and one or more additional devices. For example, communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In one embodiment, communication interface 622 provides a direct connection to a remote server via a direct link to a network, such as the Internet. Communication interface 622 may also indirectly provide such a connection through any other suitable connection.

Communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data for display on display device 624.

As illustrated in FIG. 6, computing system 610 may also include at least one input device 628 coupled to communication infrastructure 612 via an input interface 630. Input device 628 generally represents any type or form of input device capable of providing input, either computer- or human-generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In one example, databases 640 may be stored in primary storage device 632. Databases 640 may represent portions of a single database or computing device or it may represent multiple databases or computing devices. For example, databases 640 may represent (be stored on) a portion of computing system 610 and/or portions of example network architecture 700 in FIG. 7 (below). Alternatively, databases 640 may represent (be stored on) one or more physically separate devices capable of being accessed by a computing device, such as computing system 610 and/or portions of network architecture 700.

Continuing with reference to FIG. 6, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be separate devices accessed through other interface systems.

Many other devices or subsystems may be connected to computing system 610. Conversely, all of the components and devices illustrated in FIG. 6 need not be present to practice the embodiments described herein. The devices and subsystems referenced above may also be interconnected in different ways from that shown in FIG. 6. Computing system 610 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of the example embodiments described and/or illustrated herein. Additionally or alternatively, the example embodiments described and/or illustrated herein may be implemented in firmware and/or hardware.

Figure 7:
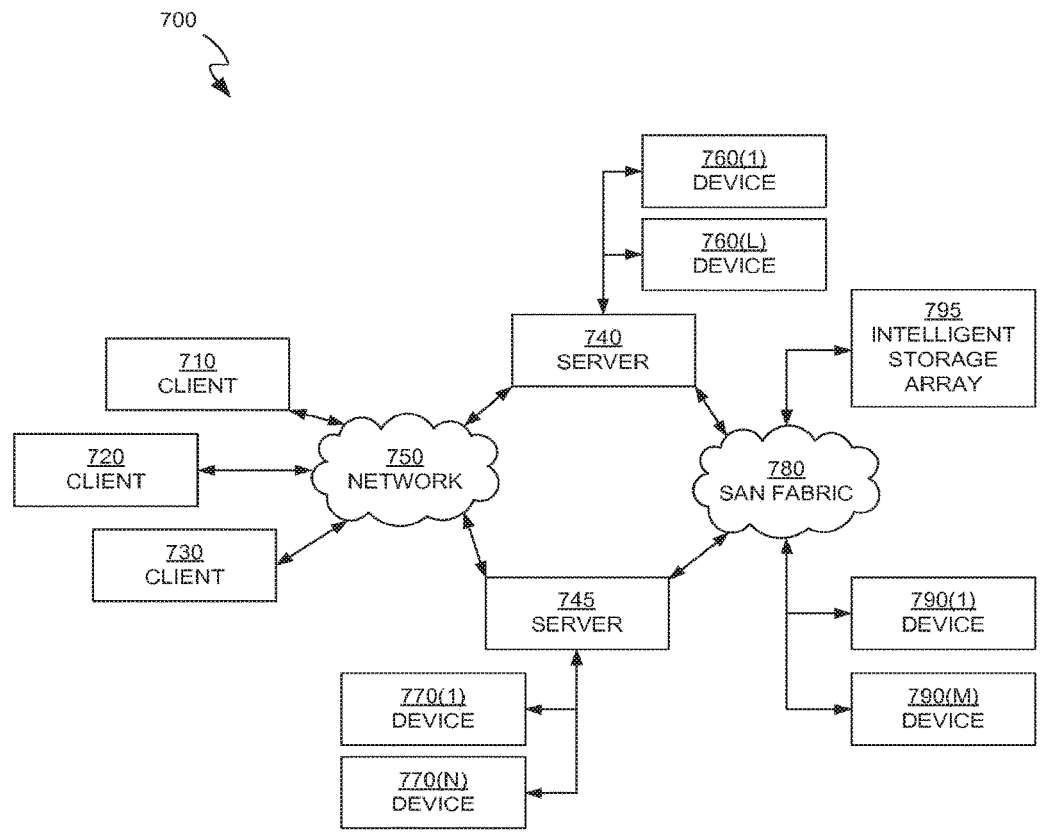
FIG. 7 is a block diagram of an example of a network architecture in which servers and client systems may be coupled to a network, according to embodiments of the invention.

FIG. 7 is a block diagram of an example of a network architecture 700 in which client systems 710, 720, and 730 and servers 740 and 745 may be coupled to a network 750. Client systems 710, 720, and 730 generally represent any type or form of computing device or system, such as computing system 610 of FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

With reference to computing system 610 of FIG. 6, a communication interface, such as communication interface 622, may be used to provide connectivity between each client system 710, 720, and 730 and network 750. Client systems 710, 720, and 730 may be able to access information on server 740 or 745 using, for example, a Web browser or other client software. Such software may allow client systems 710, 720, and 730 to access data hosted by server 740, server 745, storage devices 760(1)-(L), storage devices 770(1)-(N), storage devices 790(1)-(M), or intelligent storage array 795. Although FIG. 7 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 740, server 745, storage devices 760(1)-(L), storage devices 770(1)-(N), storage devices 790(1)-(M), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving, by a control service communicatively coupled with a plurality of computing devices, a modification request to modify a file system of a computing device, wherein the modification request is a request to modify a file system of a computing device of the plurality of computing devices, and wherein the computing device is operating in a read-only state;
    determining a target portion of the file system of the computing device affected by the modification request;
    logically partitioning the file system of the computing device into a first portion and a second portion, wherein the first portion includes the target portion and the second portion includes the file system other than the first portion;
    provisioning the first portion of the file system to operate in a read/write state, wherein the provisioning includes changing one or more permissions associated with the first portion of the file system that allow execution of the modification request, wherein the modification request is executed to modify the file system while the computing device is operating in the read/write state; and
    upon a determination that the modification request has successfully completed, provisioning, by the control service, the first portion to operate in the read-only state.

2. The method of claim 1, wherein provisioning the first portion of the file system of the computing device to operate in the read/write state comprises:
    transmitting, to the computing device, a modification command including instructions to provision the first portion to operate in the read/write state.

3. The method of claim 1, wherein the computing device performs a live provisioning to the first portion of the file system to operate in the read/write state, wherein the computing device continues to service requests while the modification request is executed.

4. The method of claim 1, wherein provisioning the first portion of the file system to operate in the read-only state comprises:
    transmitting, to the computing device, a cold-boot provisioning command, wherein the cold-boot provisioning command causes the computing device to reboot.

5. The method of claim 1, comprising determining that the modification request satisfies one or more permission criteria to perform the modification request.

6. The method of claim 5, wherein determining that the modification request satisfies one or more permission criteria comprises:
    determining an account identifier associated with the modification request; and
    determining that an account identified by the account identifier has authorization to perform a type of modification requested by the modification request.

7. The method of claim 5, wherein determining that the modification request satisfies one or more permission criteria comprises:
    determining that a type of modification requested by the modification request is permitted on a directory of the file system to be modified.

8. A system comprising:
    one or more server computers communicatively coupled to a plurality of computing devices; and
    a control service executing on the one or more server computers, wherein the control service is communicatively coupled with the plurality of computing devices, and wherein the control service is configured to perform operations comprising:

receiving a modification request, wherein the modification request is a request to modify a file system of a computing device of the plurality of computing devices, and wherein the computing device is operating in a read-only state;

determining a target portion of the file system of the computing device affected by the modification request;

logically partitioning the file system of the computing device into a first portion and a second portion, wherein the first portion includes the target portion and the second portion includes the file system other than the first portion;

provisioning the first portion of the file system to operate in a read/write state, wherein the provisioning includes changing one or more permissions associated with the first portion of the file system that allow execution of the modification request, wherein the modification request is executed to modify the file system while the computing device is operating in the read/write state; and upon a determination that the modification request has successfully completed, provisioning the first portion of the file system to operate in the read-only state.

9. The system of claim 8, wherein provisioning the first portion of the file system of the computing device to operate in the read/write state comprises:

transmitting, to the computing device, a modification command including instructions to provision the first portion to operate in the read/write state.

10. The system of claim 8, wherein the computing device performs a live provisioning to the first portion of the file system to operate in the read/write state, wherein the computing device continues to service requests while the modification request is executed.

11. The system of claim 8, wherein provisioning the first portion of the file system to operate in the read-only state comprises:

transmitting, to the computing device, a cold-boot provisioning command, wherein the cold-boot provisioning command causes the computing device to reboot.

12. The system of claim 8, wherein the control service is further configured to perform operations comprising determining that the modification request satisfies one or more permission criteria to perform the modification request.

13. The system of claim 12, wherein determining that the modification request satisfies one or more permission criteria comprises:

determining an account identifier associated with the modification request; and determining that an account identified by the account identifier has authorization to perform a type of modification requested by the modification request.

14. The system of claim 12, wherein determining that the modification request satisfies one or more permission criteria comprises:

determining that a type of modification requested by the modification request is permitted on a directory of the file system to be modified.

15. One or more non-transitory computer storage media encoded with instructions that, when executed by one or more processors, cause the one or more processors to perform operations comprising:

receiving a modification request to modify a file system of a computing device of a plurality of computing devices, wherein the computing device is operating in a read-only state;

determining a target portion of the file system of the computing device affected by the modification request;

logically partitioning the file system of the computing device into a first portion and a second portion, wherein the first portion includes the target portion and the second portion includes the file system other than the first portion;

provisioning the first portion of the file system to operate in a read/write state, wherein the provisioning includes changing one or more permissions associated with the first portion of the file system that allow execution of the modification request, wherein the modification request is executed to modify the file system while the computing device is operating in the read/write state; and upon a determination that the modification request has successfully completed, provisioning the first portion of the file system to operate in the read-only state.

16. The one or more non-transitory computer storage media of claim 15, wherein provisioning the first portion of the file system of the computing device to operate in the read/write state comprises:

transmitting, to the computing device, a modification command including instructions to provision the first portion to operate in the read/write state.

17. The one or more non-transitory computer storage media of claim 15, wherein the computing device performs a live provisioning to the first portion of the file system to operate in the read/write state, wherein the computing device continues to service requests while the modification request is executed.

18. The one or more non-transitory computer storage media of claim 15, wherein provisioning the first portion of the file system to operate in the read-only state comprises:

transmitting, to the computing device, a cold-boot provisioning command, wherein the cold-boot provisioning command causes the computing device to reboot.

19. The one or more non-transitory computer storage media of claim 15, further comprising instructions that when executed cause the one or more processors to perform operations comprising: determining that the modification request satisfies one or more permission criteria to perform the modification request.

20. The one or more non-transitory computer storage media of claim 19, wherein determining that the modification request satisfies one or more permission criteria comprises:

determining an account identifier associated with the modification request; and determining that an account identified by the account identifier has authorization to perform a type of modification requested by the modification request.

21. The one or more non-transitory computer storage media of claim 19, wherein determining that the modification request satisfies one or more permission criteria comprises:

determining that a type of modification requested by the modification request is permitted on a directory of the file system to be modified.

* * * * *